United States Patent [19]
Adler et al.

[11] 3,852,389
[45] Dec. 3, 1974

[54] METHOD OF MAKING FOAM PLASTIC BODIES HAVING LIFELIKE OUTER SKINS

[75] Inventors: Seymour Adler; Fleet E. Nuttall, both of Los Angeles; Wallace H. Shapero, Torrance, all of Calif.

[73] Assignee: Mattel, Inc., Hawthorne, Calif.

[22] Filed: Dec. 7, 1970

[21] Appl. No.: 95,596

Related U.S. Application Data

[62] Division of Ser. No. 792,921, Jan. 22, 1969, abandoned.

[52] U.S. Cl. ............ 264/46.4, 264/54, 264/DIG. 5, 264/DIG. 13, 264/DIG. 14, 264/DIG. 60
[51] Int. Cl. ............................................. B29d 27/04
[58] Field of Search .......................... 264/45, 46, 54

[56] References Cited
UNITED STATES PATENTS

| | | | |
|---|---|---|---|
| 2,586,275 | 2/1952 | Toulmin, Jr. ...................... | 264/46 |
| 2,989,782 | 6/1961 | Barkhuff, Jr. et al. ............... | 264/46 |
| 3,052,927 | 9/1962 | Hoppe et al. ....................... | 264/46 |
| 3,259,673 | 7/1966 | Ericson ............................. | 264/45 |
| 3,293,094 | 12/1966 | Nairn et al. ....................... | 264/46 X |
| 3,432,581 | 3/1969 | Rosen ............................... | 264/45 |
| 3,456,045 | 7/1969 | Rosen ............................... | 264/45 |
| 3,541,192 | 11/1970 | Shapero et al. ..................... | 264/45 |

*Primary Examiner*—Robert F. White
*Assistant Examiner*—James B. Lowe
*Attorney, Agent, or Firm*—Max E. Shirk

[57] ABSTRACT

A method of making bodies of foamed plastic comprising filling a mold initially with a plastisol having a very small amount of blowing agent which will be activated, heating the mold to form a thin gelled layer of the plastisol covering the inner surface of the mold, then charging the mold with a second plastisol containing a significantly larger amount of blowing agent that will be activated; attaching the mold to a pressure release cap whereby the pressure in the mold can be controlled; then heating the mold at a temperature sufficient to release the blowing agents in the plastisol layers, while controllably releasing the gas from the mold through the pressure release cap. After cooling, the foamed body can then be removed from the mold.

4 Claims, 3 Drawing Figures

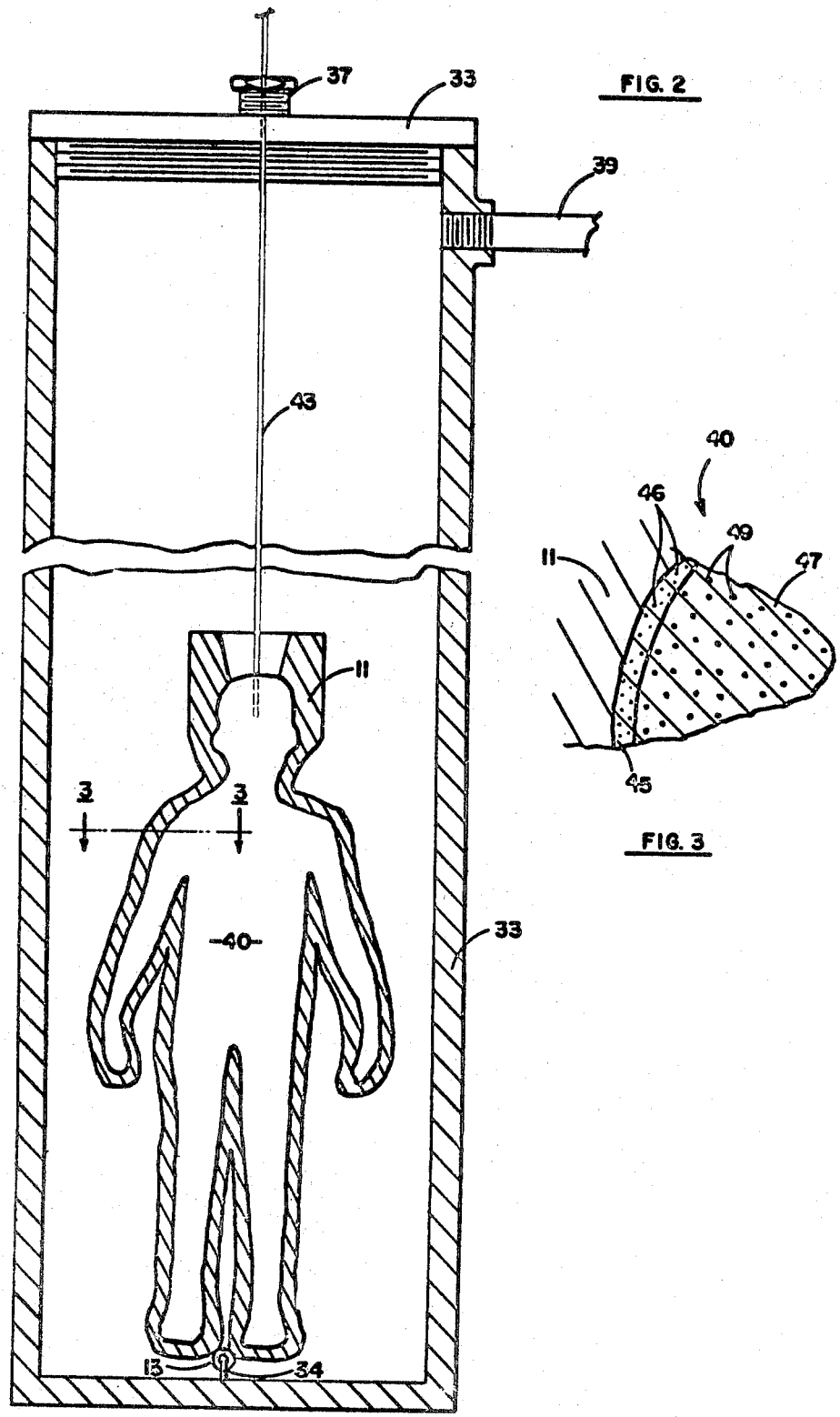

3,852,389

METHOD OF MAKING FOAM PLASTIC BODIES HAVING LIFELIKE OUTER SKINS

CROSS REFERENCE TO RELATED APPLICATION

This application is a divisional application of application Ser. No. 792,921, filed Jan. 22, 1969, and now abandoned.

BACKGROUND OF THE INVENTION

1. Field of the Invention

This invention is in the field of methods of making foamed products. More particularly, the invention relates to a method of forming polymeric material having a lifelike skin, and their method of manufacture.

2. Description of the Prior Art

Prior to the herein invention, the concept of forming an integral skin with a foamed body had been well disclosed. However, the prior formed articles did not possess an outer skin that was lifelike or suitable for utilization in forming dolls, limbs, and the like. In the previous technique, a plastisol was placed in a mold, heated to a gel point forming a thin coating on the inner wall of the mold. This plastisol contained no blowing agent. A second plastisol was then added to the mold, which plastisol contained a significant portion of blowing agent. The second plastisol was then heated to its previous process to a point where the blowing agent would be activated. This temperature additionally served to set the outer skin forming an impervious protective coating on the inner foamed product. The outer skin was durable, tough and waterproof since it contained no pores.

In an attempt to produce a lifelike body for a doll utilizing this prior technique, an attempt was made to make the skin as thin as possible since, as indicated, it was quite strong and thus not overly flexible. However, when a portion of the body would be bent, the impervious outer skin did not fold or crease in a manner at all similar to that of a normal human skin. In further attempting to produce lifelike properties, various plastisol combinations were utilized to form the outer skin in the previous techniques. Still satisfactory results were not obtainable. The body remained too stiff and the skin did not appear particularly lifelike.

OBJECTS AND SUMMARY OF THE INVENTION

Another object of this invention is to provide a method for forming a seamless foamed body having an integral skin thereon.

The above and other objects of this invention are accomplished by the herein invention which comprises providing a mold of a doll body or other suitable object, first filling the mold with a plastisol containing a small amount of blowing agent; rotocasting or slushmolding the plastisol to cover the entire inner wall of the mold in a thin layer; heating the plastisol to a gel; subsequently filling the mold with a second plastisol containing a significantly greater amount of blowing agent; and heating the mold to a point where the blowing agents in both the outer layer of plastisol and the second inner plastisol causes expansion thereof. Concurrent with the aforegoing heating step, the pressure built up in the mold due to release of the blowing agent is controlled through a pressure release valve. The body is then cooled and a top inlet cap of the mold may be opened. The mold may then be optionally placed in a pressure chamber where it is subjected to a pressure sufficient to compact the foamed product therein whereby the item can be easily withdrawn from the mold. After a part is pulled from the mold, the pressure chamber is depressurized, opened and the final item removed.

BRIEF DESCRIPTION OF THE DRAWINGS

FIG. 2 is a cross sectional view of the pressurization chamber used in the withdrawing of parts from the mold in performing the method of the invention.

FIG. 3 is a cross sectional view of a formed part made in accord with this invention.

DESCRIPTION OF THE PREFERRED EMBODIMENT

Figure 1:
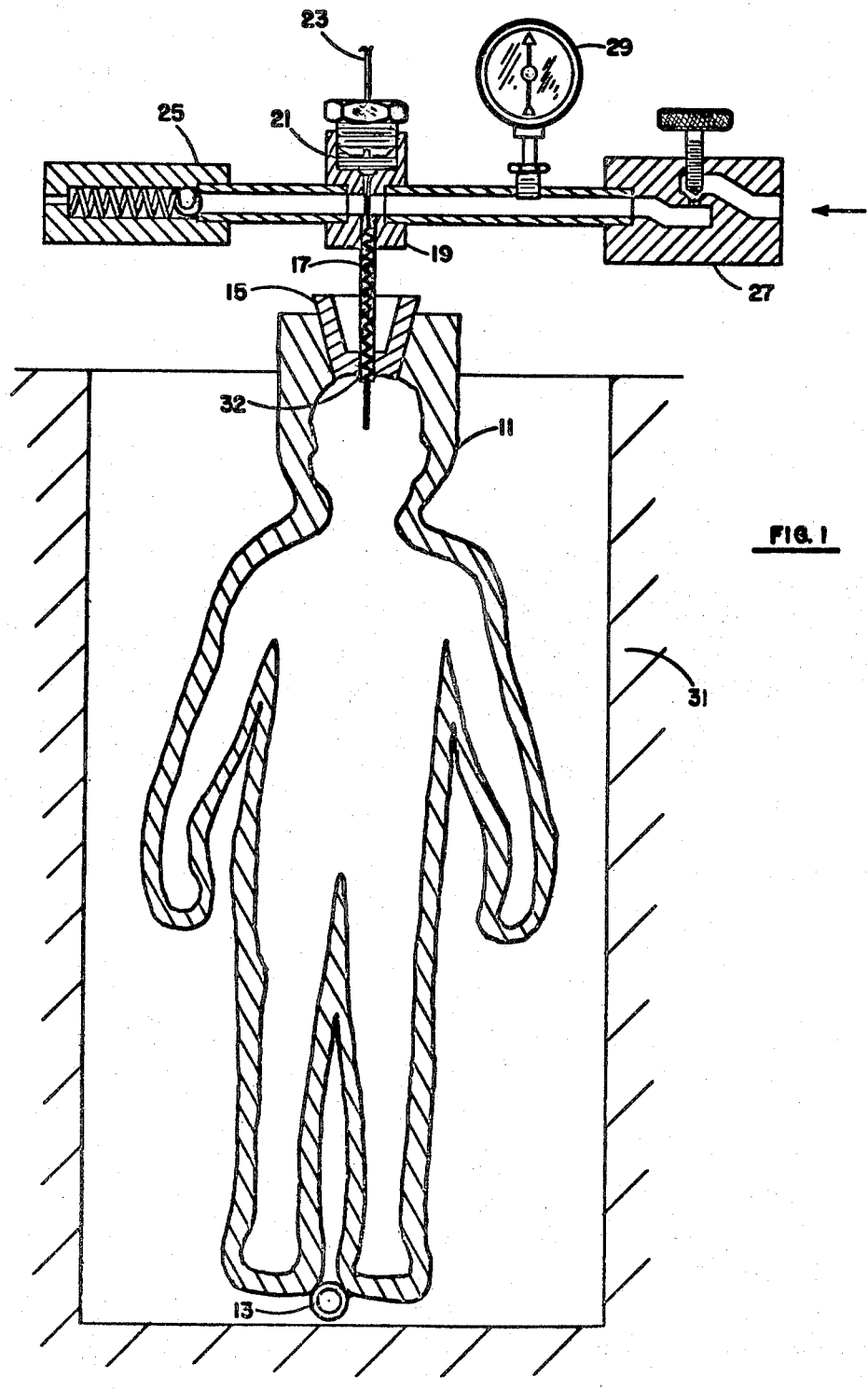
FIG. 1 is a partially sectioned pictorial view of the apparatus used to form the method of the invention.

The most noticeable difference between a device made in accord with the method of this invention and that of the prior art, as indicated, relates to the texture of the outer skin. Unlike the prior art devices, wherein the outer skin is tough, durable and impenetrable, the skin of the herein device has a plurality of cells therein, is flexible and easily bendable. It most closely resembles human skin in its characteristics. To achieve this effect, a small amount of blowing agent is incorporated in the plastisol used to form the outer skin. Generally, in forming dolls it is preferred that the outer skin be comprised mostly of a closed cellular structure rather than an open cellular one. This insures the skin being impermeable to water and the like. On the other hand, an open cellular structure would enable liquids to pass through the skin and be absorbed in the main body portion. In all of the prior art applications wherein outer skins or layers are formed adjacent to foamed bodies, the skins had no foaming agent therein and thus resulted in significantly different feel, texture and appearance.

The plastisol utilized to form the outer skin of the herein invention should be selected to provide a smooth surface which is pliable, soft to the touch and resembles as close as possible human skin, especially when bent to wrinkle. To achieve the foregoing, many conventional plastisol formulations can be utilized, since these properties are to a large degree controlled by the very small amount of blowing agent utilized in this invention. The plastisol compositions normally contain a vinyl resin such as polyvinyl chloride, suitable plasticizer, activators to regulate the temperature at which foaming action will start, a stabilizer which furnishes heat stability, pigment as desired, and of course the small amount of blowing agent. Typical compositions of plastisols and blowing agents are disclosed in U.S. Pat. No. 3,293,094.

To achieve the particular skin texture desired entails a relatively straightforward trial and error procedure wherein one can vary the amount of plasticizer to resin ratio as well as all the other ingredients in the composition. To accomplish this particular skin texture in accord with the novel approach of this invention, the amount of blowing agent incorporated in the skin plastisol formula is not critical, as will be further explained. For example, up to 10 parts per 100 parts of resin, phr, can be utilized. What is important, rather than the amount of blowing agent used, is how much of the blowing agent incorporated in the skin formulation is actually activated at the setting temperature for the skin. This is dependent upon the type of activator utilized in the formulation. If the activator serves to activate the blowing agent at very high temperatures, almost equivalent to the temperature at which the skin is heated, or above, only a small amount of the blowing agent will actually blow to expand the skin within a chosen time period. The choice of activator profoundly affects the rate of release at a given time and temperature, but acting as a catalyst it cannot set an absolute limit as to the amount of gas released. Thus, once the temperature and activator are set, the amount of blowing agent activated is time dependent. It has been found that to produce a most desirable result, from 0.1 to 2 phr of blowing agent should be activated in the skin at the curing temperature.

The composition for the main portion of the body within the skin, also referred to as fill, is essentially the same as the skin, with the major difference being the amount of blowing agent activated. Unlike the skin, one normally is interested in achieving the lowest density foam possible for a given formulation within the main body. Obviously, the properties of the fill are not as critical as those of the outer skin. Thus, a wider variety of formulations are possible, depending upon the softness, strength, durability and the like, desired in the main body. However, for simplicity in manufacturing and the like, as indicated, the composition of the fill will normally closely resemble that used in the skin with only the amounts of the particular materials subject to variance as desired. The significant difference, however, between the skin and the fill will be in the amount of blowing agent activated. It has been found that a minimum of 3 phr of blowing agent should be activated at the curing temperature in order to achieve a reasonable density foam in the fill. Generally, this will range, depending upon the composition, up to 10 phr of blowing agent activated.

To obtain a different perspective of the relationship between the outer skin layer and the fill composition, reference is had to the densities that are desired in both materials. A typical plastisol utilized for the skin or the fill would have a density of 75–80 pounds per cubic foot. After the blowing agent has been activated in accord with this invention and in the amounts referred to above, the density of the skin is reduced to a range of 40 to 70 pounds per cubic foot. This compares to the density in the final blown fill composition of about 10 pounds per cubic foot. Thus, it can be seen that the skin will range from 4 to 7 times as dense as the fill or main portion of the formed article.

The significant density differential between the skin and the fill has a practical effect. The denser skin is obviously heavier and more expensive since a greater amount of the composition is present. It has been found that the skin layer preferably should be about 1/16 of an inch thick. This will assure significant toughness as well as lifelike characteristics. The skin layer can exceed this thickness by a significant amount without noticeably having a detrimental effect. However, as just indicated, the cost of the end product increases, as well as its overall weight. It should be obvious, though, that a skin thickness of ⅛ or even ¼ of an inch can be successfully utilized if desired for a particular application.

In order to explain the process of forming a product in accord with this invention, attention is now directed to the Figures, and FIG. 1 particularly. There is seen a single mold 11 in the shape of a doll. This mold can be formed or cast out of conventional mold material such as copper or aluminum. The mold is preferably provided with a loop 13 at its bottom end which will serve for later attachment to secure it while the part formed is withdrawn. At the upper or head end of the mold there is provided a plug 15 having an inlet line 17 passing therethrough to permit the introduction of gas pressure and the subsequent release of excess pressure. Line 17 is connected to a fitting 19 which houses a packing gland 21 through which rod 23 passes. Rod 23 extends into the cavity of the mold and serves, as will be explained, to remove the formed body from the mold. Additionally affixed to fitting 19 and communicating with line 17 is a pressure relief valve 25 and shut-off valve 27. The pressure within the mold is sensed by a pressure gauge 29.

In order to form the product of this invention, the cap or plug 15 is removed from the mold 11. The mold is then filled with the formulation utilized to provide the outer skin. Two techniques can be equally and successfully utilized to form the outer skin. Both of the techniques are well known and conventional in the art and thus will not be described in extreme detail. The first technique is known as slush molding. In this operation, the entire mold is filled with the skin formulation and the cap 15 replaced. The mold is then heated such as by immersing it in a tank 31 containing hot or boiling water, or may be heated in an oven, to gel a layer of skin having the desired thickness. During this heating step, the skin is merely progressively thickened to the viscosity that it doesn't run off the mold's surface due to gravity. When the cap is opened, it is similar to removing the lid from a honey bottle. The skin is disturbed only around the peripheral seal and replacing the cap re-establishes this continuity to a large extent. Inlet line 17 passes through plug 15 having a portion 32 extending into the mold cavity. During the gelling of the outer skin layer the end of the portion 32 is thus not covered by the skin. This enables the line 17 to be in direct communication with the interior of the mold during the blowing of the main fill portion.

As previously indicated, it is preferable that the practical average minimum thickness of skin be 1/32 of an inch before blowing. Thus, the mold 11 is submerged in the boiling water until at least 1/32 inch outer layer of the skin formulation is gelled about its inner walls. In simple shapes, however, this layer can be as thin as 0.005 inch. This is then followed by removing the mold from the bath, unplugging it and emptying the remaining ungelled material. The mold is then heated in a bath to a temperature sufficient to set the skin. This temperature is below that at which the blowing agent in the skin formulation is activated, yet will be sufficient to set the polymer so that it will not be affected by the subsequent admission of the main plastisol formulation to the mold. An example of the temperature and time conditions sufficient to set the outer skin is 300°F for about 2 minutes.

Alternate to the aforegoing slush molding technique, the outer skin can be formed by rotocasting where only the exact amount of formulation required is admitted followed by the steps of closing the mold and then rotating it about a plurality of axes in an oven with a temperature sufficient to gel or set the outer skin. Once again, for example, the temperature can be in the neighborhood of typically 300°F.

After the skin has been set on the walls of the mold, using either of the above two methods, the cap 15 is again removed and the fill formulation is admitted. The entire cavity of the mold is filled with the formulation and the residue heat in the outer skin and mold walls serves to gel a layer of the fill formulation. After a residency time in the mold, which can range, for example, from 1 to 3 minutes, which time is sufficient to cause a layer of a thickness of ⅛ to ¼ inch of fill formulation to form on the skin, the mold is then emptied of the remaining fill formulation.

Following the emptying of the mold, the cap 15 is replaced together with the pressure valves 25 and 27. The mold is then pressurized by admitting air through valve 27. The pressure in the mold is raised, for example, to between 15 to 30 psi. The mold is then placed in a hot salt bath at a temperature of, typically, 340° to 390°F, which is sufficient to activate the blowing agent. The pressure in the mold serves two main purposes: It allows the two layers, namely the skin and fill formulation, to achieve a uniform temperature before the blowing agents are released. Since the strength of the resultant materials is greatly affected by temperatures at which they are formed, this is very important and assures that the foam products are formed at the most desirable temperature. Additionally, the pressurization allows the production of the foam to occur simultaneously in both layers. This eliminates creation of gas pockets or foaming in one spot and other deleterious side effects.

A further major advantage of the method, particularly in the formation of the products of the herein invention, is that the pressure in the mold serves to provide a superior skin which is smooth, and conforms well to the contour of the mold throughout the blowing operation. Without the pressure, the skin area tends to pull away from the mold and irregularities often arise. As the pressurized mold is heated, the blowing agent will be activated at the temperatures which set if off. The pressurization in the mold has served to compact the two layers closely against the walls of the mold, allowing for the aforegoing heat transfer to better and more readily occur, such that the layers are brought to actual blowing agent activation temperature almost simultaneously.

As the blowing agents are activated, there is a pressure build up in the mold. The pressure relief valve 25 is set to relieve the pressure just at the point of the initial pressure in the mold. Thus, for example, if the mold pressure is 30 psi, as soon as this is exceeded, the pressure relief valve releases the gas built up from the mold so that a constant 30 psi is maintained. During this period the skin and fill formulation partially expands in the cavity. The mold is then removed from the salt bath and cooled in water to a temperature of, for example, 100°F. Simultaneously with the mold's immersion in the water, valve 27 is opened allowing a partial release of the pressure in the mold. At this point, there is a full expansion of the skin and fill formulation in the cavity.

Following the above steps, the foam body is then ready for removal from the mold. If a conventional split mold is used, then the body is simply removed therefrom. However, in the specific example shown herein, cap 15 is first loosened. The valves are additionally removed together with the cap 15 at this point, leaving only the rod 23 extending into the mold. The mold 11 together with rod 23 is then inserted into a vessel 33 with the bottom of the mold hooked through loop 13 to the bottom thereof. As will be explained, the vessel 33 must extend at least twice the length of the mold 11 so that the formed body can be removed from the mold yet remain within the vessel. After the mold has been hooked with container 33, a top pressure-tight lid 35 is secured thereto. Lid 35 has a packing gland 37 therein through which passes rod 23.

A pressure line 39 intersects mold 33 and serves to admit air sufficient to pressurize the entire vessel. At a pressure of about 100 psi a typical product formed in accord with this invention will be compressed within mold 11 to a volume equivalent to 40 percent of the formed article. As can be appreciated, with an article that is in the shape of a body 40, such as that shown in the drawings, the neck portion 41 is normally the smallest area through which the body must pass if it is to be withdrawn from the mold. Thus, the pressure in the vessel 33 is raised to a point where it is sufficient to compress the foamed body in mold 11 to a point where it can pass through the neck when rod 33 is pulled upward toward the top of the mold. As can be readily seen, this method provides for a virtually seamless article, since there are no parting lines from the mold. After the body is completely withdrawn from the mold by pulling rod 23, the pressure is released through line 39 and top 35 removed so that the product can be withdrawn. The aforegoing pressure removal is a novel method which forms the basis of a separate patent application.

Following is the specific procedure followed to form a doll in accord with this invention.

DESCRIPTION OF OPERATION

The skin formulation utilized to form the doll was comprised of the following materials, with amounts given in parts per 100 parts of resin:

| | |
|---|---|
| Polyvinyl chloride | 100.0 |
| Dioctyl phthalate plasticizer | 100.0 |
| Expoxidized tallate plasticizer | 5.0 |
| Pigment | 2.0 |
| Blowing Agent | 0.9 |
| Zinc oxide activator | 0.12 |
| Stabilizer | 2.0 |

The specific blowing agent utilized in the above formulation was azodicarbonamide 1,1'-azobisformamide. The stabilizer utilized was Advasol ABD-6, made by the Advance Division of Carlisle Chemical Works, Inc.

The formulation for the main body fill was comprised of the following materials, with amounts given in parts per 100 parts of resin:

| | |
|---|---|
| Polyvinyl chloride | 100.0 |
| Dioctyl phthalate | 72.5 |
| Dioctyl adipate plasticizer | 22.5 |
| Epoxidized tallate | 5.0 |
| Blowing agent | 6.0 |
| Zinc oxide activator | 0.12 |
| Stabilizer | 3.0 |

The mold utilized had the configuration of a doll body and possessed a total volume of 2000 milliliters. The mold was filled with the skin formulation. The mold was then submerged in boiling water for 40 seconds. After removal from the hot water, the mold was then emptied of excess skin formulation. This provided a 100 gram layer of the skin formulation covering the mold's surface to a depth of perhaps 1/32 of an inch. The mold was then heated at 300°F for 2 minutes in a salt bath in order to set the skin. This was then immediately followed by filling the mold with the fill formulation. At the end of 1½ minutes, the excess fill formulation which did not gel upon contact with the hot skin was drained from the mold. A 270 gram layer of fill formulation on the skin of about ⅛ inch was thus provided. The mold was then attached to a pressure release cap and pressurized to 30 psi. Following pressurization, the mold was submerged in a salt bath which was at 370°F and kept there for 6½ minutes during which time the blowing agent was activated and the polymer cured.

At the end of the curing time, the mold was then placed in a 300° bath for 15 seconds to cool the immediate surface of the formed doll, thereby increasing its viscosity and reducing any surface-movement effects as the interior expands during pressure reduction. Following the 300° bath, the mold was then cooled in air while the pressure was released over a period of 2 minutes and the pressure finally reduced to 5 psi. This was done in order to allow the molten plastisol to expand and fill the mold. Following the air cooling and reduction of pressure of 5 psi, the mold was then cooled in cold water for 15 minutes, after which time the pressure cap was removed.

In order to extract the formed cooled product from the mold, the mold was placed in a vessel which was pressurized to 100 psi and the product was withdrawn in accord with the procedure previously described.

The resultant products of this invention have a constituency as depicted in the cross sectional view of FIG. 3 where the outer skin 45, which is a thin layer, has a few sparsely located cells 46 formed therein as a result of the blowing agent incorporated. The main fill portion 47 which comprises the body of the item formed has considerably more cells 49 therein as compared to the outer skin 45. It is important to note, however, that both the outer skin 45 and the main body portion 47 are comprised of essentially the same composition and are both cellular. Because of this, the outer skin 45 behaves very similarly to the main body portion 47 when the item is squeezed, bent or in any way deformed. It has been found that if a great dissimilarity exists between the outer skin and the main body portion, when the item is so bent the skin does not behave in a manner at all similar to human skin since its basic mechanical properties are so dissimilar.

Although a doll figuration is shown in the FIGS, it should be quite apparent that this invention is applicable to other components. Since one of the main purposes of the invention is to provide a lifelike outer skin on a foamed body, the invention naturally is most useful in forming items where this is particularly desired. This would include limbs and other artificial portions of the body. Further, the invention is obviously applicable to producing any shape of foam body having the particular type of outer skin as herein described.

The times, temperatures and various other conditions specifically set forth in the aforegoing specification are merely exemplary of those required for particular formulations utilized to provide the doll described. It is within the skill of the art to determine the precise conditions within the scope of this invention necessary to achieve the most suitable properties for a given application.

What is claimed is:

1. A method of making foamed plastic bodies having an outer skin fused thereto comprising:
   providing a suitable mold having the desired size and shape of said body,
   coating all of the inner walls of said mold with a first plastisol composition, said composition including a blowing agent, and suitable activator capable of causing a small amount of gas to be released in said composition,
   heating said mold after said first plastisol is coated thereon to gel a layer of said plastisol without releasing any blowing agent,
   depositing a second plastisol on the heated surface of said first plastisol before activation of the activator in said first plastisol composition whereby the residual heat gels a layer of said second plastisol without releasing any blowing agent therein; said second composition including a blowing agent and suitable activator capable of causing a larger amount of blowing agent to be released in said second plastisol than said first plastisol, and then simultaneously heating both said first and second plastisols for a sufficient period of time to cause a small amount of gas to be released in said first plastisol and a larger amount of gas to be released in said second plastisol.

2. The method of claim 1 comprising:
   releasing from 0.10 to 2 parts of blowing agent per hundred parts of resin in said first plastisol composition.

3. The method of claim 1 comprising:
   releasing at least 3 parts of blowing agent per hundred parts of resin in said second plastisol composition.

4. The method of claim 1 additionally comprising:
   pressurizing said mold to a predetermined pressure after said layers of plastisol have been gelled,
   heating said mold to a temperature sufficient to release said blowing agents,
   said pressure in said mold being sufficient to allow both layers of plastisol to reach the same temperature before a simultaneous release of the blowing agents.

* * * * *